M. W. STAPLES.
Reciprocating Churns.
No. 140,796.  Patented July 15, 1873.
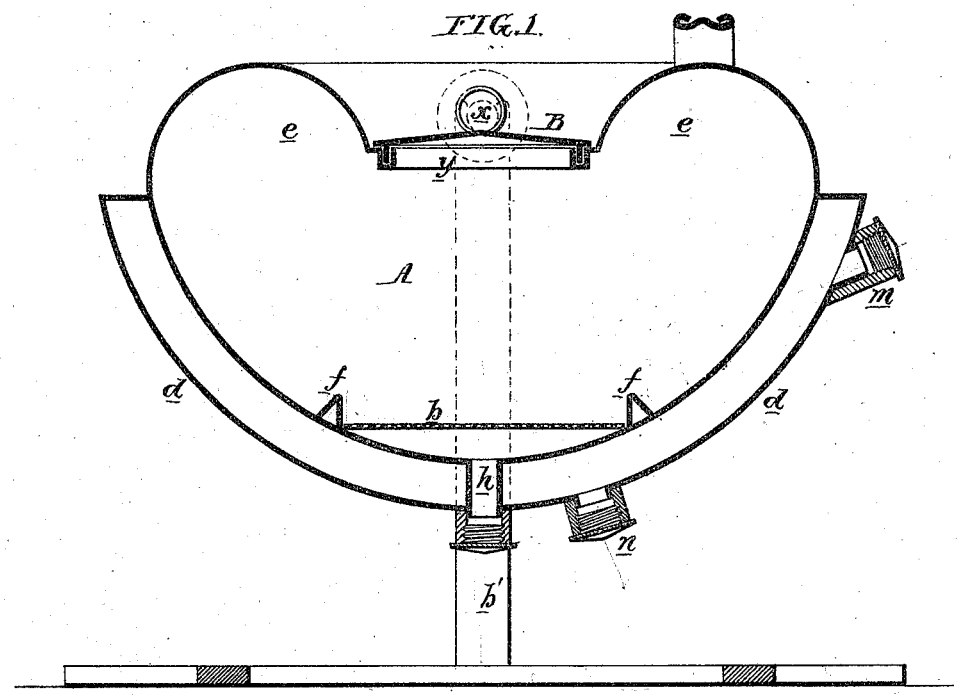
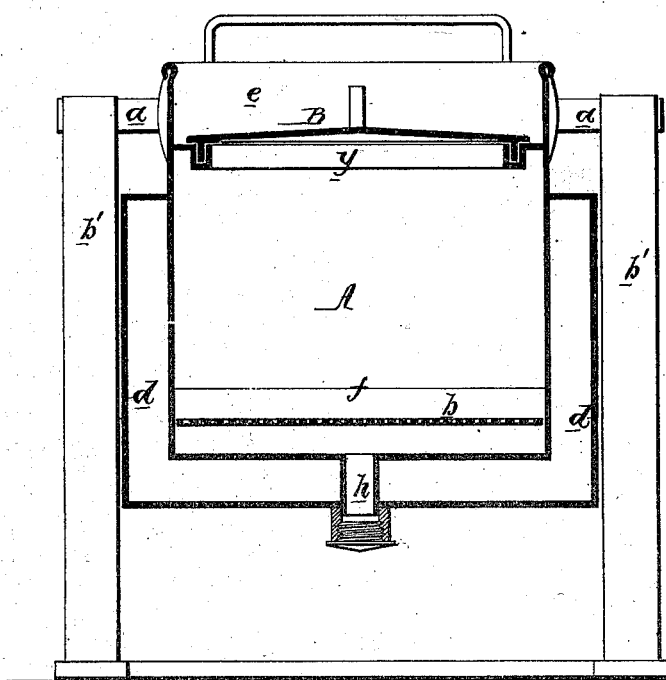
Witnesses Harry Smith
Hubert Howson
M. W. Staples
By his attys,
Howson and Son

UNITED STATES PATENT OFFICE.

MOSES W. STAPLES, OF RICHMOND, VIRGINIA.

IMPROVEMENT IN RECIPROCATING CHURNS.

Specification forming part of Letters Patent No. 140,796, dated July 15, 1873; application filed March 19, 1873.

*To all whom it may concern:*

Be it known that I, MOSES W. STAPLES, of Richmond, Henrico county, Virginia, have invented an Improved Churn, of which the following is a specification:

The object of my invention is the rapid and economical production of butter from cream, and this object I attain by a vessel, A, of a shape substantially as shown in the vertical section, Fig. 1 of the accompanying drawing, and having spaces $e\ e$ of such a character that violent reactions of the contents will take place when the vessel is vibrated, the butter accumulating on the perforated platform $b$, on which it is retained by projecting ribs $f\ f$. The vessel has a jacket, $d$, so as to form a space for receiving warm water, which facilitates the production of cream. At opposite sides of the vessel are trunnions $a\ a$, adapted to bearings in the standards $b'\ b'$, so that the vessel can be swung to and fro, the center of vibration being at $x$, Fig. 1. The cream is introduced through an opening, $y$, in the top of the vessel, the said opening being provided with a detachable cover, B. Water of a proper temperature is introduced into the jacket through the inlet-branch $m$, and may be withdrawn through the outlet-branch $n$, to make way for a new supply, both branches being furnished with detachable screw-plugs.

On imparting a vibrating motion to the vessel, a thorough agitation of the cream takes place, the peculiar shape given to the ends $e\ e$ of the vessel directing the fluid from the sides toward the center of the vessel, and causing violent reactions, which facilitate the production of the butter, the latter accumulating on the perforated plate $b$, and rolling backward and forward on the same as the vessel vibrates, but being retained on the plate by the internal ribs $f\ f$. After the churning has been completed, the butter-milk may be withdrawn through the discharge-pipe $h$, and on turning the vessel upside down, the butter may be discharged through the opening $y$ into any suitable receptacle.

I claim as my invention—

The suspended vessel A having spaces $e\ e$, arranged as described, and provided with a perforated plate, $b$, and ribs $f$, for the purpose set forth.

In testimony whereof I have signed my name to this specification in the presence of two subscribing witnesses.

M. W. STAPLES.

Witnesses:
M. M. GILLIAM,
J. D. K. SLEIGHT.